United States Patent [19]
Mitomi et al.

[11] Patent Number: 5,227,707
[45] Date of Patent: Jul. 13, 1993

[54] INTERFERENCE AVOIDING SYSTEM OF MULTI ROBOT ARMS

[75] Inventors: Takashi Mitomi, Higashiosaka; Yoichi Sugitomo, Nishinomiya, both of Japan

[73] Assignee: Matsushita Electric Industrial Co., Ltd., Osaka, Japan

[21] Appl. No.: 936,451

[22] Filed: Aug. 28, 1992

[30] Foreign Application Priority Data

Aug. 29, 1991 [JP] Japan ................... 3-218369

[51] Int. Cl.$^5$ .................. G05B 19/00; B25J 19/00
[52] U.S. Cl. .................. 318/568.1; 318/568.16; 318/587; 395/83; 395/90; 901/8
[58] Field of Search .................. 318/560–636; 395/80–99; 901/3, 5, 7, 8, 9, 12, 15, 17, 19, 20, 21

[56] References Cited

U.S. PATENT DOCUMENTS

| | | | |
|---|---|---|---|
| 4,163,183 | 7/1979 | Engelberger et al. | 318/568.13 |
| 4,260,940 | 4/1981 | Engelberger et al. | 318/562 |
| 4,260,941 | 4/1981 | Engleberger et al. | 318/568.2 |
| 4,409,650 | 10/1983 | Noguchi | 318/573 X |
| 4,445,184 | 4/1984 | Noguchi | 395/85 |
| 4,633,385 | 12/1986 | Murata et al. | 364/191 |
| 4,644,237 | 2/1987 | Frushour et al. | 318/640 |
| 5,084,826 | 1/1992 | Hariki et al. | 395/83 |
| 5,086,262 | 2/1992 | Hariki et al. | 318/568.1 |
| 5,150,026 | 9/1992 | Seraji et al. | 318/568.11 |
| 5,150,452 | 9/1992 | Pollack et al. | 395/90 |

*Primary Examiner*—Paul Ip
*Attorney, Agent, or Firm*—Wenderoth, Lind & Ponack

[57] ABSTRACT

The interference avoiding system is provided with an automatic correcting means for correcting a code string programmed for each robot, so that the communication and the waiting processes to check the interference are automatically inserted. In order to check the interference, a target position is transmitted to a checking device immediately before the robot starts operating, thereby to check the interference area by the checking device. Instead, data of the interference area is fed to a robot controller at the start of operation, and the communication is established only when the robot moves from inside to outside the interference area or vice versa. An operation command for the robots is selectively corrected automatically, that is, an operation command to move the robots in a direction not related to the interference direction is not corrected.

6 Claims, 12 Drawing Sheets

INTERFERENCE AVOIDING SYSTEM OF MULTI ROBOT ARMS

BACKGROUND OF THE INVENTION

The present invention relates to a controlling system in a robot system adapted to avoid mutual collision of industrial robot arms when operating adjacent to each other.

A plurality of robots have recently been arranged in the same space of a production line in many cases so as to increase the productivity per area, etc. Although the robots are controlled to operate independently and asynchronously in such case as above, it is necessary to establish a system to avoid the collision of the robots.

SUMMARY OF THE INVENTION

The object of the present invention is therefore to provide an interference avoiding system of multi robot arms whereby a program can be formed independently for each robot without minding the collision of robots.

An another object of the present invention is to provide an interference avoiding system of multi robot arms whereby a program can be formed without minding the interference area of robots, and is not necessary to be changed even when the interference area is changed.

A further object of the present invention is to provide an interference avoiding system of multi robot arms which can restrict the communications processing time required to check the operation of the robot system.

In order to accomplish the above-described objects of the present invention, according to one aspect of the present invention, there is provided an interference avoiding system of multi arms in a robot system equipped with a plurality of robots; robot controllers for controlling respective robots; and a checking device which communicates with the each robot controller,
wherein each robot controller is provided with:
a storing means;
a control means for controlling an operation of the robot in accordance with a code string stored in the storing means;
means for communicating with the checking device;
means for transferring the code string stored in the storing means to the checking device through communication; and
means for storing the code string transferred from the checking device in the storing means through the communication,
while the checking device is provided with:
means for setting an interference area of the operation of the plurality of robots;
means for reading the code string in the storing means of each robot controller through the communication;
means for automatically correcting the read code string;
means for transferring the corrected code string to the robot controller through the communication; and
means for discriminating whether or not the robots interfere with each other based on the communication with the robot controller thereby to transmit an operation permission signal when it discriminates that the robots do not interfere, the correcting means finding the operation of the robots in the read code string, and communicating with the discriminating means immediately before the robot starts operating, thereby to insert a processing code into the code string to suspend a next start of operation until an operation permission signal is received from the checking device.

In the interference avoiding system according to the first aspect of the present invention, the checking device reads the code string transferred from the robot controller as a program for the robot, and the correcting means of the checking device automatically inserts a processing code to avoid the interference of the robots into the program of the robot. The corrected code string is stored in the storing means of the robot controller. Therefore, the program of each robot can be formed without taking care of the collision of the robots.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

The present invention will be discussed in detail with reference to the accompanying drawings taken in conjunction with preferred embodiments thereof.

Figure 2:
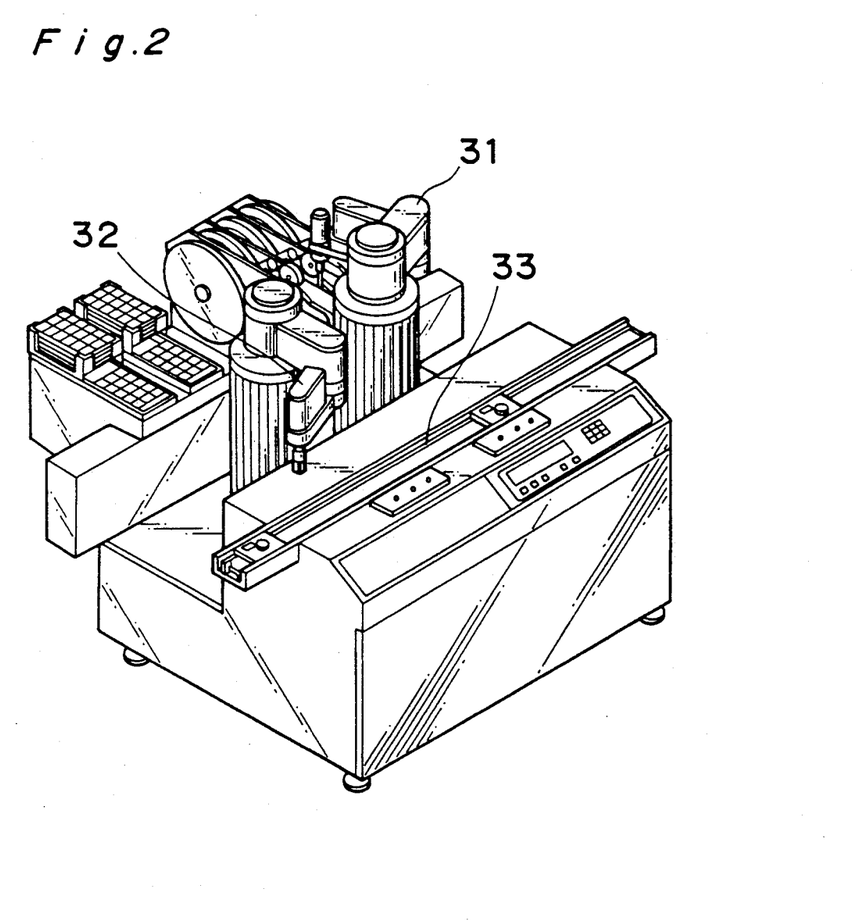
FIG. 2 is a perspective view showing the appearance of a robot system in the first embodiment of the present invention.

The appearance of a robot system according to a first embodiment of the present invention is made clear from FIG. 2. In the first embodiment, first and second robots 31, 32 are horizontal multi-joint robots and controlled by the respective robot controllers 2, 3. While the first and second robots 31, 32 are arranged adjacent to each other to assemble works on the same conveyor 33, the first and second robots 31, 32 can operate independently and asynchronously. Therefore, an independent operating program is formed for each robot.

Figure 1:
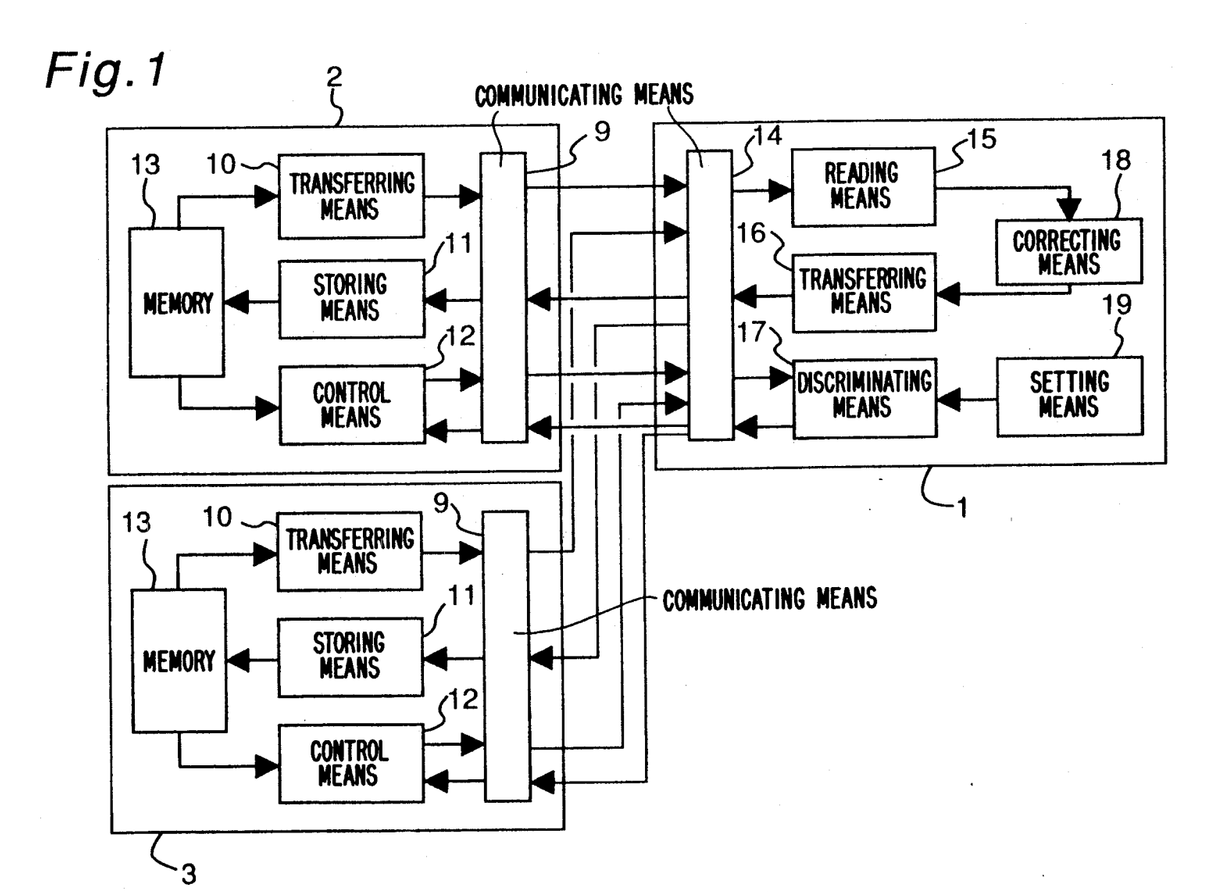
FIG. 1 is a block diagram of the structure of an interference avoiding system according to a first embodiment of the present invention.
Figure 3A:
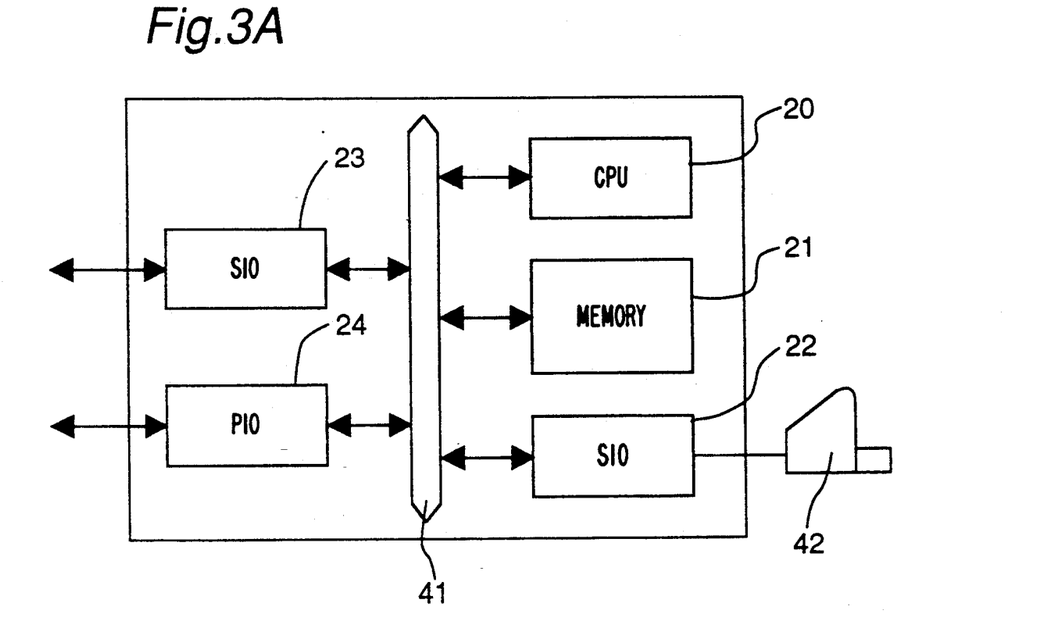
FIG. 3A is a block diagram explanatory of the hardware of a checking device in the first embodiment.
Figure 3B:
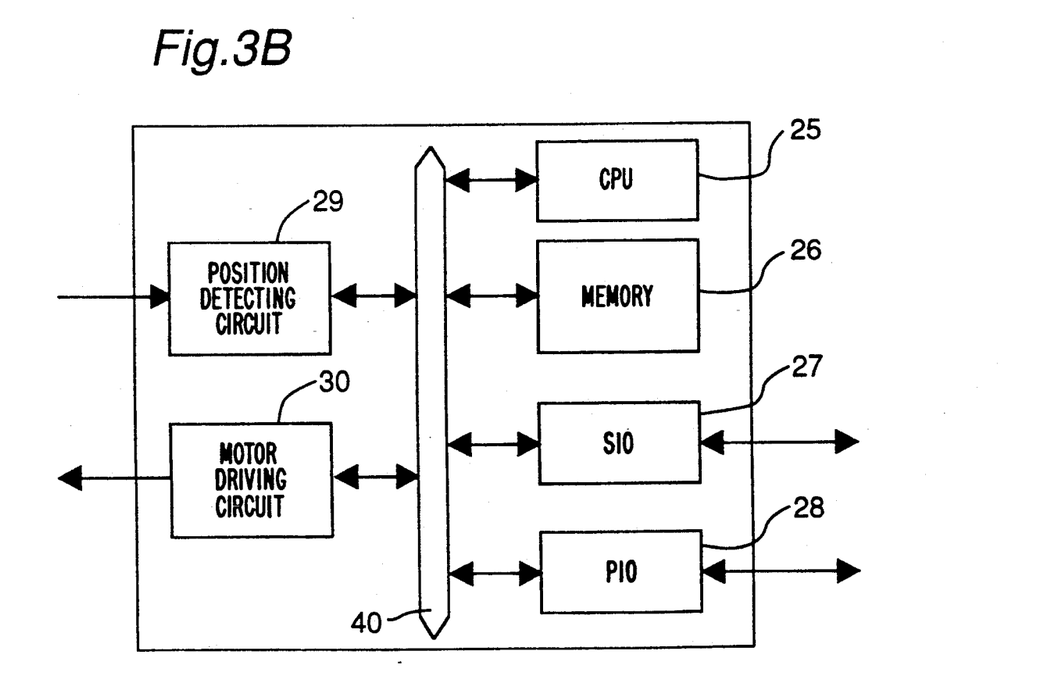
FIG. 3B is a block diagram explanatory of the hardware of a robot controller in the first embodiment.

FIG. 1 is a structural block diagram of the robot controllers 2 and 3 and a checking device 1. Each of the robot controllers 2 and 3 has the same construction. FIGS. 3A and 3B are respectively diagrams explanatory of the hardware of the checking device 1 and each of the robot controllers 2 and 3. In FIG. 3A, the checking device 1 has a CPU 20, a memory 21, a serial input/output (SIO) 22 connected with an input/output terminal 42 such as a display and a keyboard, a serial input/output 23 (referred to as SIO hereinafter) for serial communication with each of the robot controllers 2 and 3, and a parallel input/output 24 (referred to as PIO hereinafter) for parallel communication with each of the robot controllers 2 and 3. The CPU 20, the memory 21, the SIOs 22 and 23, and the PIO 24 are connected with a common bus 41. Each of the robot controllers 2 and 3 has a position detecting circuit 29 for detecting the position of a hand of the robot, a motor driving circuit 30 for driving the hand by a motor, a CPU 25, a memory 26, a serial input/output 27 (referred to as SIO hereinafter) connected with the SIO 23 in the checking device 1 for serial communication, and a parallel input/output 28 (referred to as PIO hereinafter) connected with the PIO 24 in the checking device 1 for parallel communication. The position detecting circuit 29, the motor detecting circuit 30, the CPU 25, the memory 26, the SIO 27, and the PIO 28 are connected with a common bus 40. Each of the robot controllers 2 and 3 can communicate with the checking device 1 through the SIO 27 and the PIO 28. Each of the robot controller 2 and 3 executes a program for control of the corresponding robot with a programming language obtained by extending a program language BASIC with a robot control command. The program described by BASIC is sequentially executed in the form of a code string by a program stored beforehand in a memory 13 connected with a control means 12 in each robot controller 2, 3 as shown in FIG. 1. Also a communicating means 9, a transferring means 10, a storing means 11, and the control means 12 are realized by the program stored in the memory 26 beforehand. The communicating means 9 communicates with the checking device 1. The transferring means 10 transfers the code string stored in the memory 13 to the checking device 1 through the communicating means 9. The storing means 11 stores the code string transferred from the checking device 1 through the communicating means 9 into the memory 13. The control means 12 communicates with the checking device 1 through the communicating means 9 and then, for example, transmits the present position of the arm of the robot to the checking device 1 immediately before the robot starts operating. On the other hand, the checking device 1 is provided with a communicating means 14, a reading means 15, a correcting means 18, a transferring means 16, a setting means 19, and a discriminating means 17 which are realized by the program beforehand stored in the memory 21 of the checking device 1.

The communicating means 14 communicates with each of the robot controllers 2 and 3. The reading means 15 reads the code string in the memory 13 of each robot controller 2, 3 through the communicating means 14 to set the interference area of the operation of the first and second robots 31 and 32. The correcting means 18 automatically corrects the read code string. The transferring means 16 transfers the corrected code string to each robot controller 2, 3 through the communicating means 14. The discriminating means 17 discriminates whether or not the first and second robots 31 and 32 interfere with each other based on the communication content from each robot controller 2, 3 thereby to permit operation when it discriminates that the first and second robots 31 and 32 do not interfere based on the data stored beforehand in the memory 21 by the setting means 19. That is, the interference area is set by the setting means 19 based on the data from each of the robot controllers 2 and 3 and stored in the memory 21 of the checking device 1. The discriminating means 17 communicates with each robot controller 2, 3 through the communicating means 14.

Figure 4:
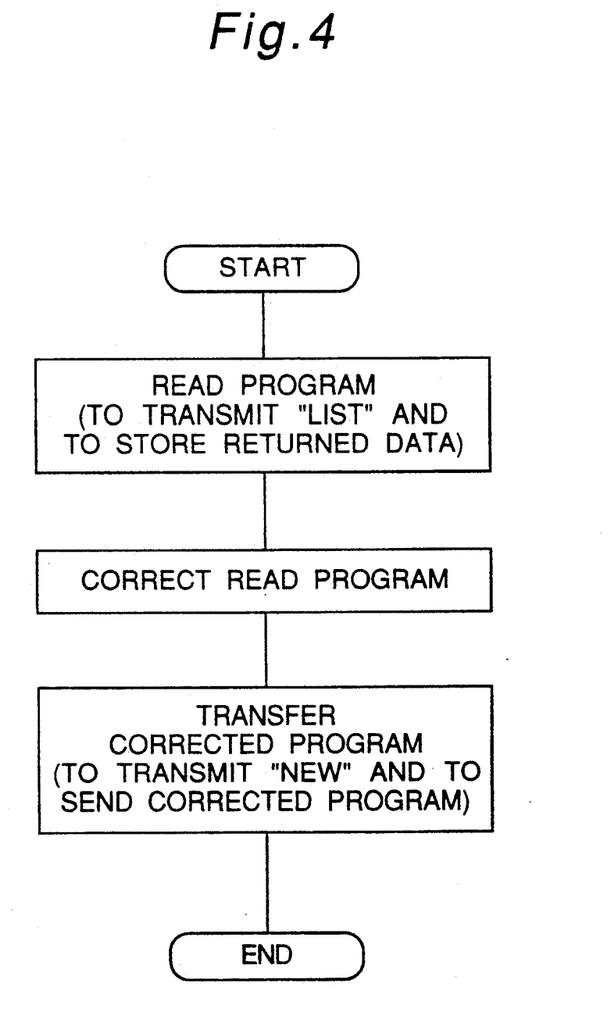
FIG. 4 is a flow chart of the operation of a checking system of the checking device which reads/corrects a program and transfers the program to the robot controller in the first embodiment.
Figure 5:
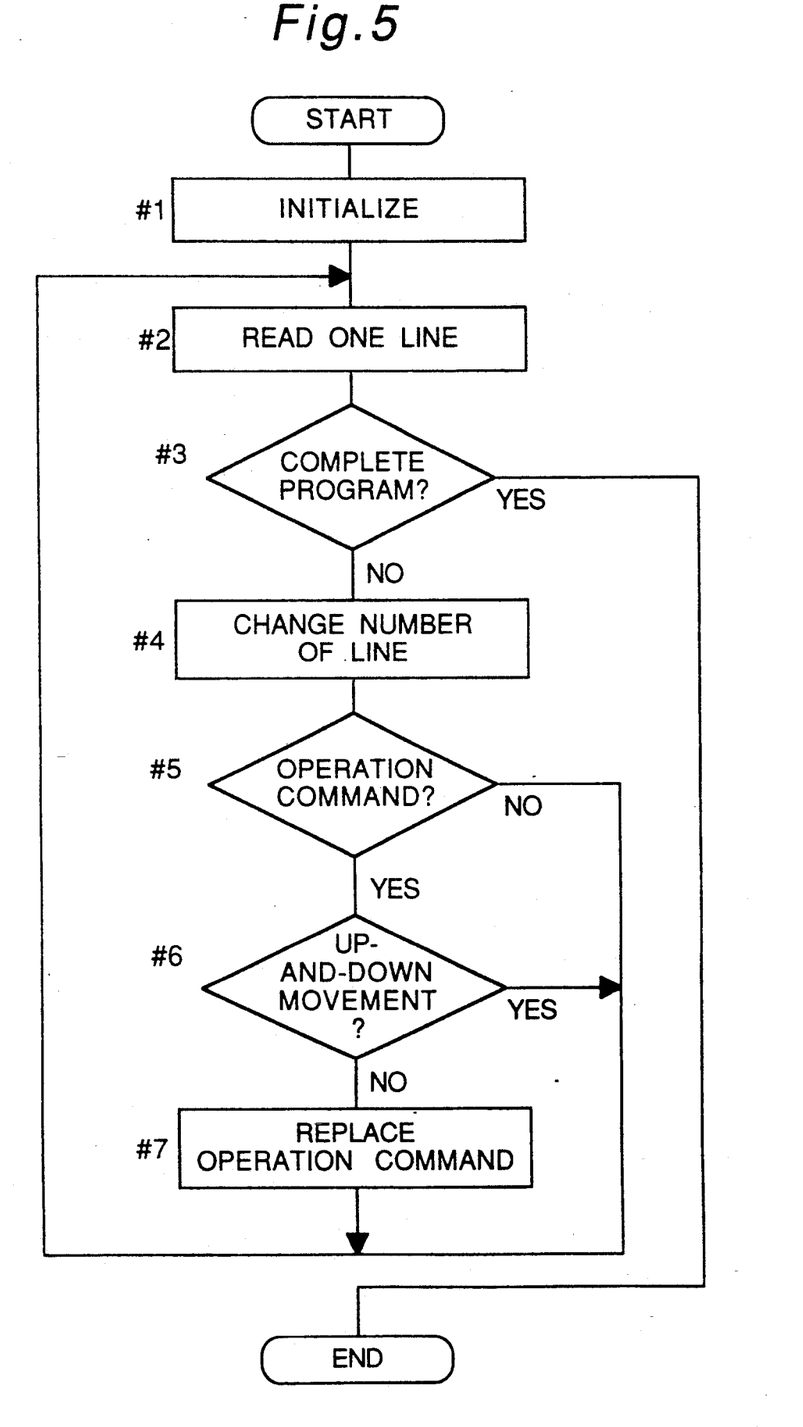
FIG. 5 is a flow chart of the correcting process in FIG. 4.

When a program is input to each robot controller 2, 3, the checking device 1 serially communicates with the robot controller 2, 3, reads the program by the reading means 15, corrects the read program by the correcting means 18 to prevent the interference between the first and second robots, and transfers the corrected program to each robot controller 2, 3 by the transferring means 16 to store it into the memory 13 of the robot controller 2, 3 by the storing means 11 through the communicating means 14 and 9. The above process is indicated in a flow chart of FIG. 4. FIG. 5 is a flow chart of the correcting process carried out by the correcting means 18. An initialization process is to transmit the present position of the arm of the robot from the control means 12 of each robot controller to the checking device 1. An operation command of each robot in the code string is replaced with a sub routine executing a processing flow of FIG. 6. That is, the correcting means 18 of the checking device 1 transmits a target operating position of the robot from the control means 12 of each robot controller 2, 3 to the checking device 1 immediately before the robot starts operating, with inserting a first processing code to wait for the operation permission signal from the checking device 1 and a second processing code to inform an operation completion immediately after the robot completes its operation into the code string. It is to be noted here, however, that the up-and-down movement of the robots 31 and 32 has nothing to do with the interference therebetween if the robots 31 and 32 are arranged in the manner as in the first embodiment, and therefore, the operation command is not replaced when it is clear from the description of the program that the robots 31 and 32 move only in the up-and-down direction. Then, the correcting means 18 inserts a processing code to selectively communicate with the checking device 1 depending on an operating direction of the robot.

Figure 6:
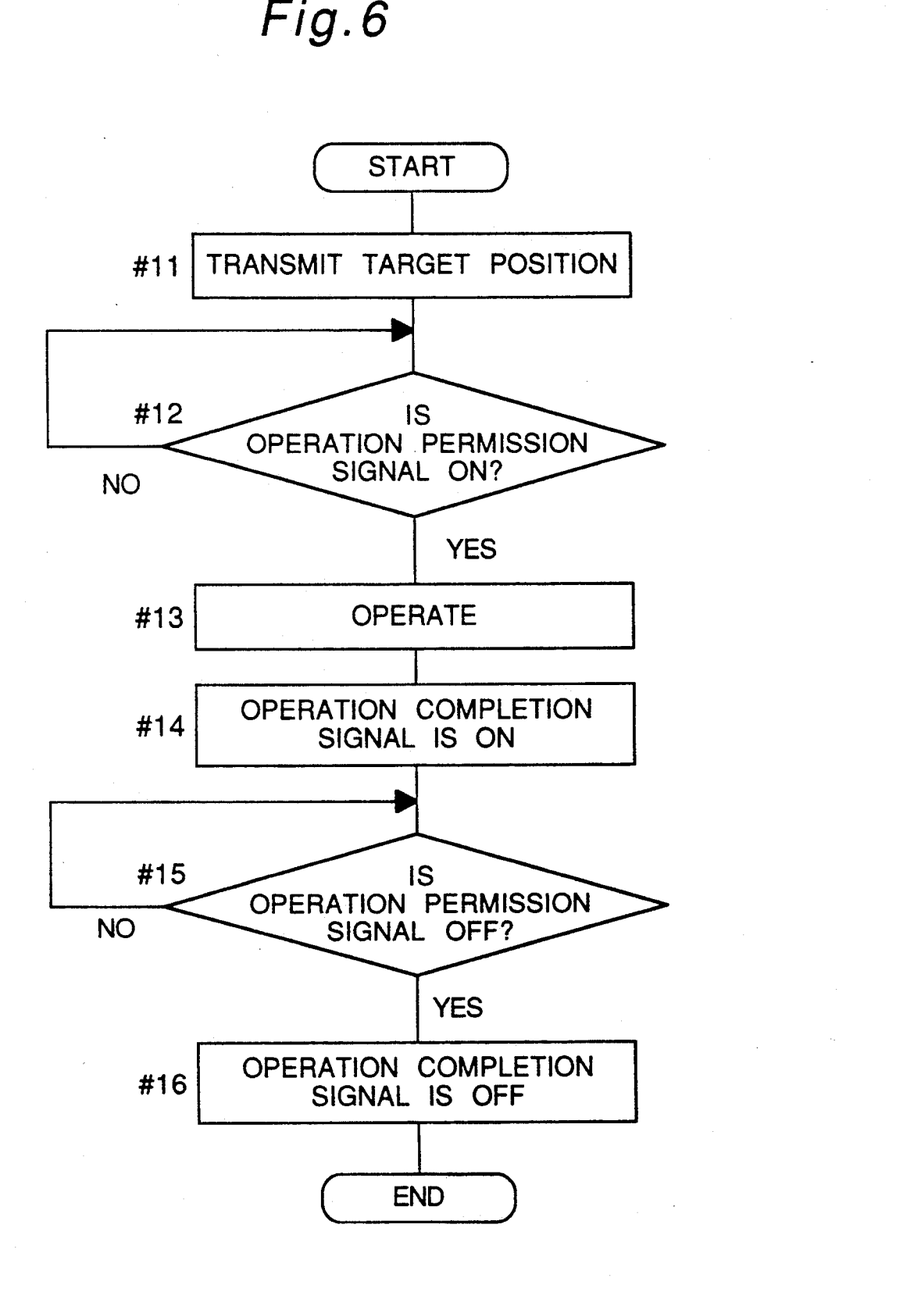
FIG. 6 is a flow chart of a sub routine wherein an operation command of a robot is replaced in FIG. 5.

In executing the operation command to drive the robots in the horizontal direction, the process shown in FIG. 6 is conducted by the robot controllers. The checking device 1 discriminates by the discriminating means 17 whether or not the robots 31 and 32 interfere with each other and transmits an operation permission signal when it discriminates that the robots 31 and 32 do not interfere, in accordance with the processing flow shown in FIGS. 7-10. A target operating position is always transmitted before each robot 31, 32 works in a direction related to the interference area, with an operation completion signal generated when the operation is completed. Therefore, the checking device 1 can check the interference correctly. Since each robot 31, 32 does not start operating until it receives an operation permission signal from the checking device 1, the robots 31 and 32 can work without collision therebetween.

A process to read and correct a program of the checking system of the checking device 1 and to transfer the program to the robot controller 2, 3 will be depicted hereinbelow. Referring to FIG. 4, a program in the memory 13 is read out by the reading means 15, that is, "LIST" is transmitted and the returned data is stored. After the read program is corrected by the correcting means 18, the corrected program is transferred by the transferring means 16, in other words, "NEW" is transmitted and then, the corrected program is transferred.

A correcting flow will be described with reference to FIG. 5. An initialization is performed in step #1. A line is read by the reading means 15 in step #2. It is decided whether the program is finished or not in step #3. When the program is finished in step #3, the correcting flow is completed. On the other hand, when the program is not finished in step #3, the number of the line is changed by the correcting means 18 in step #4 and, it is detected in step #5 whether or not an operation command is present. In the case where an operation command is absent in step #5, the flow is returned to step #2, where a next one line is read by the reading means 15. Steps #3–#5 are repeated afterwards. If an operation command is present in step #5, it is detected in step #6 whether it is the up-and-down movement. Since the robots 31 and 32 do not interfere when the robots 31 and 32 move up and down, the flow is returned to step #2. However, when the robots 31 and 32 operate not in the up-and-down direction in step #6, namely, the robots 31 and 32 operate in the horizontal direction, a replacing process is carried out by the correcting means 18 in step #7. After step #7, the flow is returned to step #2.

A sub routine to replace an operation command of the robot 31, 32 in the replacing process will be explained. In FIG. 6, a target position is transmitted from the robot controller to the checking device 1 in step #11. At step #12, the robot controller waits until an operation permission signal from the checking device 1 is turned ON. The robot is moved to the target position in step #13 when the operation permission signal is turned ON. An operation completion signal is turned ON in step #14. Thereafter, the robot controller it is waited until the operation permission signal is turned OFF in step #15. The operation completion signal is turned OFF in step #16 when the operation permission signal is turned OFF in step #15.

Figure 7:
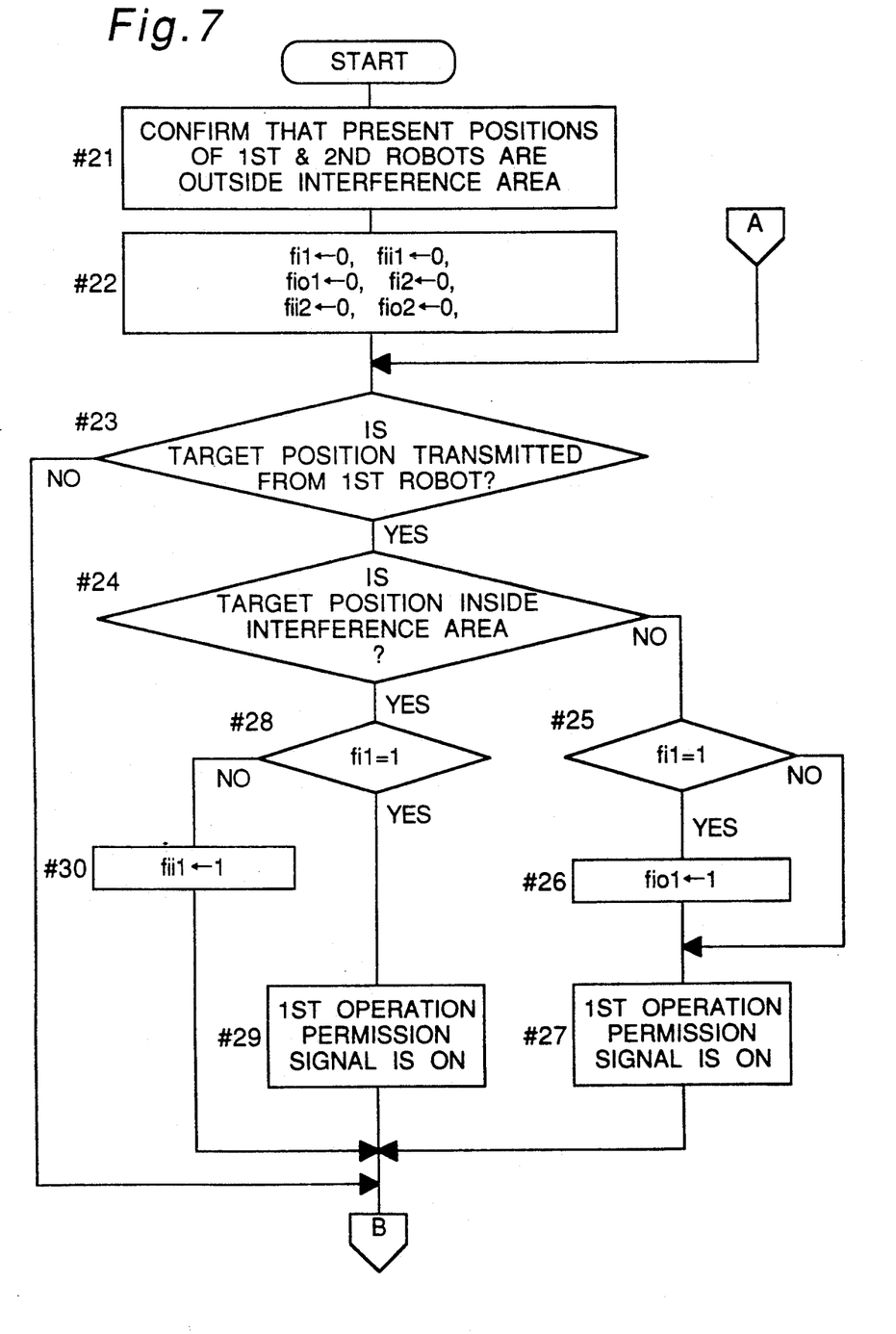
FIG. 7 is a flow chart when the checking system is operating in the first embodiment.

A processing flow when the checking system is driving will now be described hereinafter. Referring to FIG. 7, first, it is confirmed in step #21 that the present position of the arm of each robot 31, 32 is outside the interference area. Each of the flags fi1, fii1, fio1, fi2, fii2, and fio2 is turned to 0 in step #22, that is, the flags are initialized. Each flag has the following function. The flags fi1, and fi2 discriminate whether or not the robots 31 and 32 are inside the interference area, respectively. When each flag indicates 1, it means that the robot is inside the interference area. When each flag is 0, the robot is outside the interference area. Meanwhile, the flags fio1 and fio2 are indicative of the fact that the robots 31 and 32 are moving from inside the interference area to outside the interference area. Therefore, when each of the robots 31 and 32 is moving so, the flag is 1. When each of the robots 31 and 32 is kept stopping, the flag shows 0. Further, the flags fii1 and fii2 are provided to check whether or not the robots 31 and 32 are inside the interference area. Each of the flags is 1 when the robot is being checked, and 0 except for the case when the checking is being performed. In step #23, it is detected whether or not the target position is transmitted from the robot 31 to the checking device 1. If the target position is not transmitted, the process will be advanced to the processing flow in FIG. 8. When the target position is transmitted, it is decided by the discriminating means 17 in step #24 whether the target position is inside the interference area. When the target position is outside the interference area, it is decided in step #25 whether the flag fi1 is equal to 1. In the case where the flag fi1 is not equal to 1 (the first robot 31 is moving from outside the interference area to outside the interference area), a first operation permission signal for the first robot 31 is turned ON in step #27 and the flow is advanced to the processing flow in FIG. 8. If the flag fi1 is equal to 1 in step #25 (the first robot 31 is moving from inside the interference area to outside the interference area), the flag fio1 is turned to 1 in step #26, and the first operation permission signal is changed to ON in step #27. The flow is advanced to FIG. 8. When the target position is inside the interference area in step #24, it is decided in step #28 whether fi1=1. If fi1=1 (the first robot 31 is moving from inside the interference area to inside the interference area), the first operation permission signal is turned ON in step #29. The flow is then moved to FIG. 8. If the flag fi1 is not 1 in step #28 (the first robot 31 is moving from outside the interference area to inside the interference area), the flag fii1 is turned to 1 in step #30, and then the flow is proceeded to FIG. 8.

Figure 8:
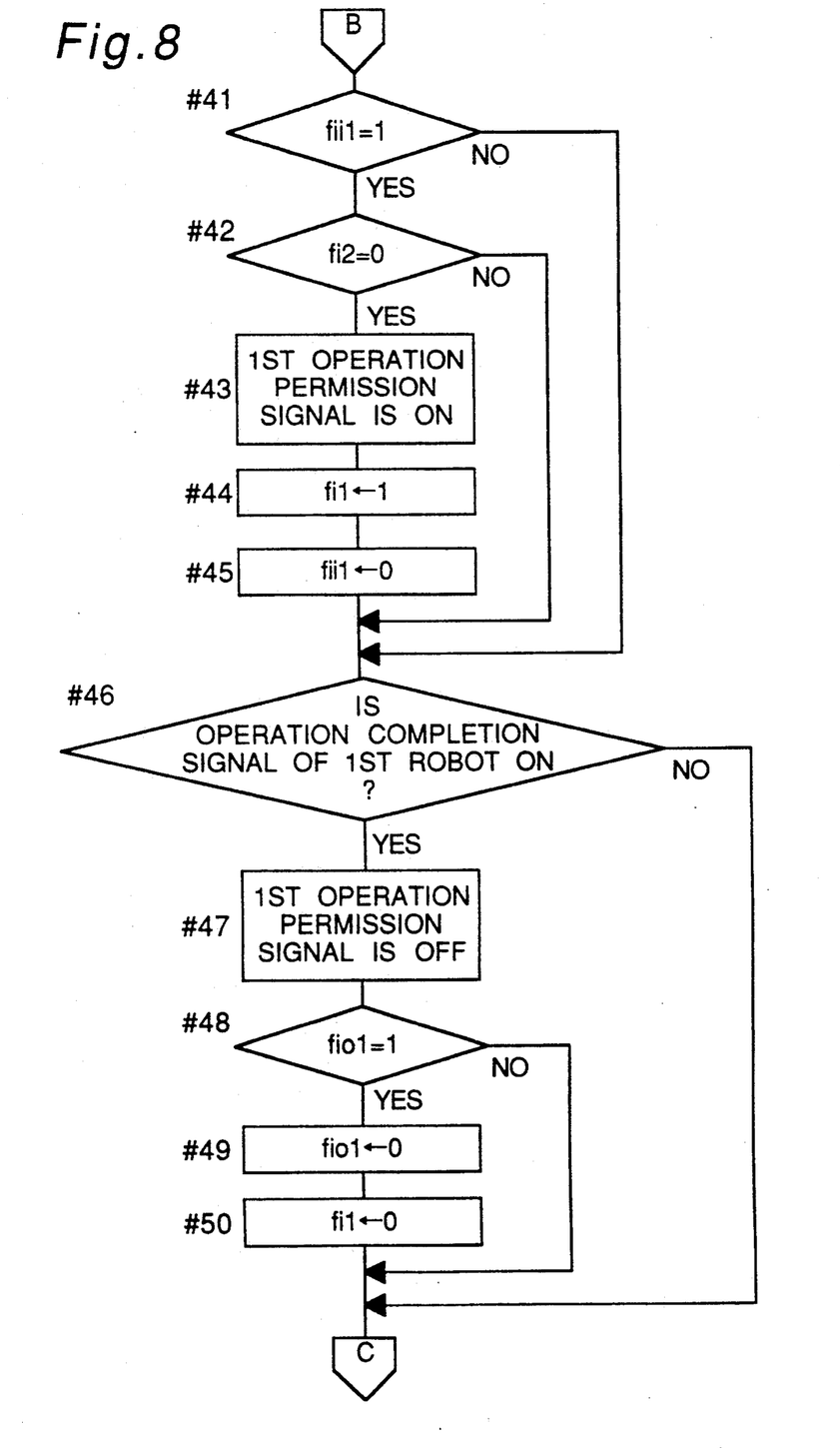
FIGS. 8-10 are flow charts when the checking system is operating in the first embodiment.

Now, a processing flow subsequent to that in FIG. 7 will be described with reference to a flow chart of FIG. 8. Referring to the flow chart, when fii1=1 in step #41, the flow moves to step #42, where it is decided whether fi2=0. When fi2=0, the first operation permission signal is turned ON in step #43, the flag fi1 is turned to 1 in step #44 and the flag fii1 is set to 0 in step #45, then the flow is moved to step #46. On the other hand, if the flag fii1 is not 1 in step #41, or if the flag fi2 is not 0 in step #42, the flow skips to step #46. It is decided in step #46 whether the operation completion signal of the first robot 31 is ON, that is, the first robot 31 completes operation. In the case where the operation is completed, the first operation permission signal is turned OFF in step #47, and it is decided in step #48 whether the flag fio1 is 1. When the flag fio1 is equal to 1, the flag fio1 is changed to 0 in step #49, and the flag fi1 is made 0 in step #50 to advance to a processing flow in FIG. 9. If the operation completion signal of the first robot 31 is not ON in step #46, the flow is forwarded to FIG. 9. Likewise, when fio1=1 is not held in step #48, the flow is moved to FIG. 9.

Figure 9:
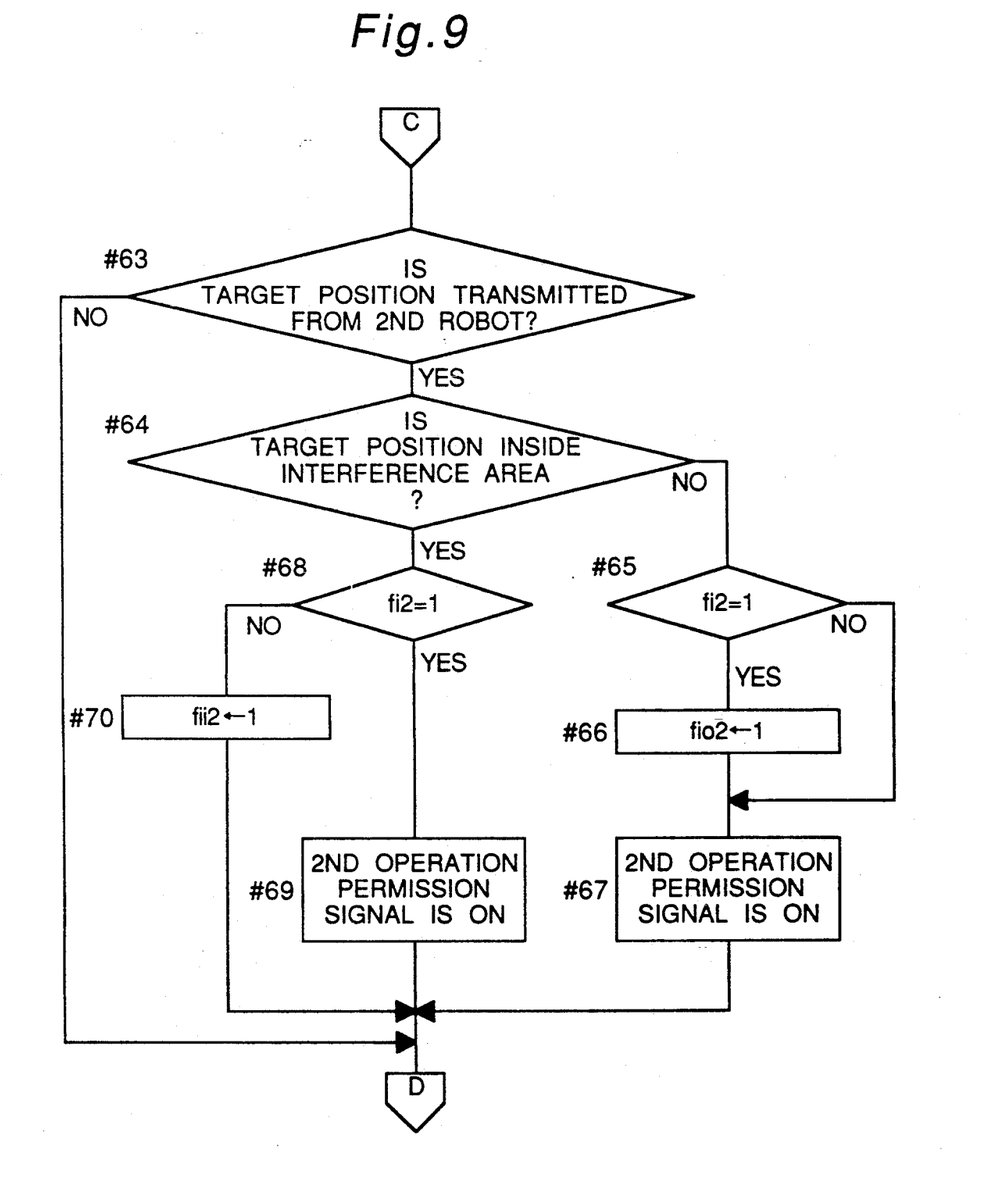

A succeeding processing flow of the checking system will be explained with reference to FIG. 9. In FIG. 9, it is decided in step #63 whether the target position is transmitted from the second robot 32 to the checking device 1. In the case where the target position is not transmitted, the flow proceeds to FIG. 10. In the case where the target position is transmitted, it is checked in step #64 whether the target position is inside the interference area. If the target position is outside the interference area, it is checked in step #65 whether fi2=1. When the flag fi2 is not 1 (the second robot 32 is moving from outside the interference area to outside the interference area), a second operation permission signal for the second robot 32 is turned ON in step #67 and the flow is proceeded to FIG. 10. If fi2=1 in step #65 (the second robot 32 is moving from inside the interference area to outside the interference area), fio2 is turned to 1 in step #66, and the second operation permission signal is turned ON in step #67, then the process is moved to a flow in FIG. 10. When the target position is inside the interference area in step #64, it is decided in step #68 whether fi2=1. In the case of fi2=1 (the second robot 32 is moving from inside the interference area to inside the interference area), the second operation permission signal becomes ON in step #69. The flow is brought to FIG. 10 then. If fi2=1 is not held in step #68 (the second robot 32 is moving from outside the interference area to inside the interference area), after the flag fii2 is changed to 1 in step #70, the flow proceeds to FIG. 10.

Figure 10:
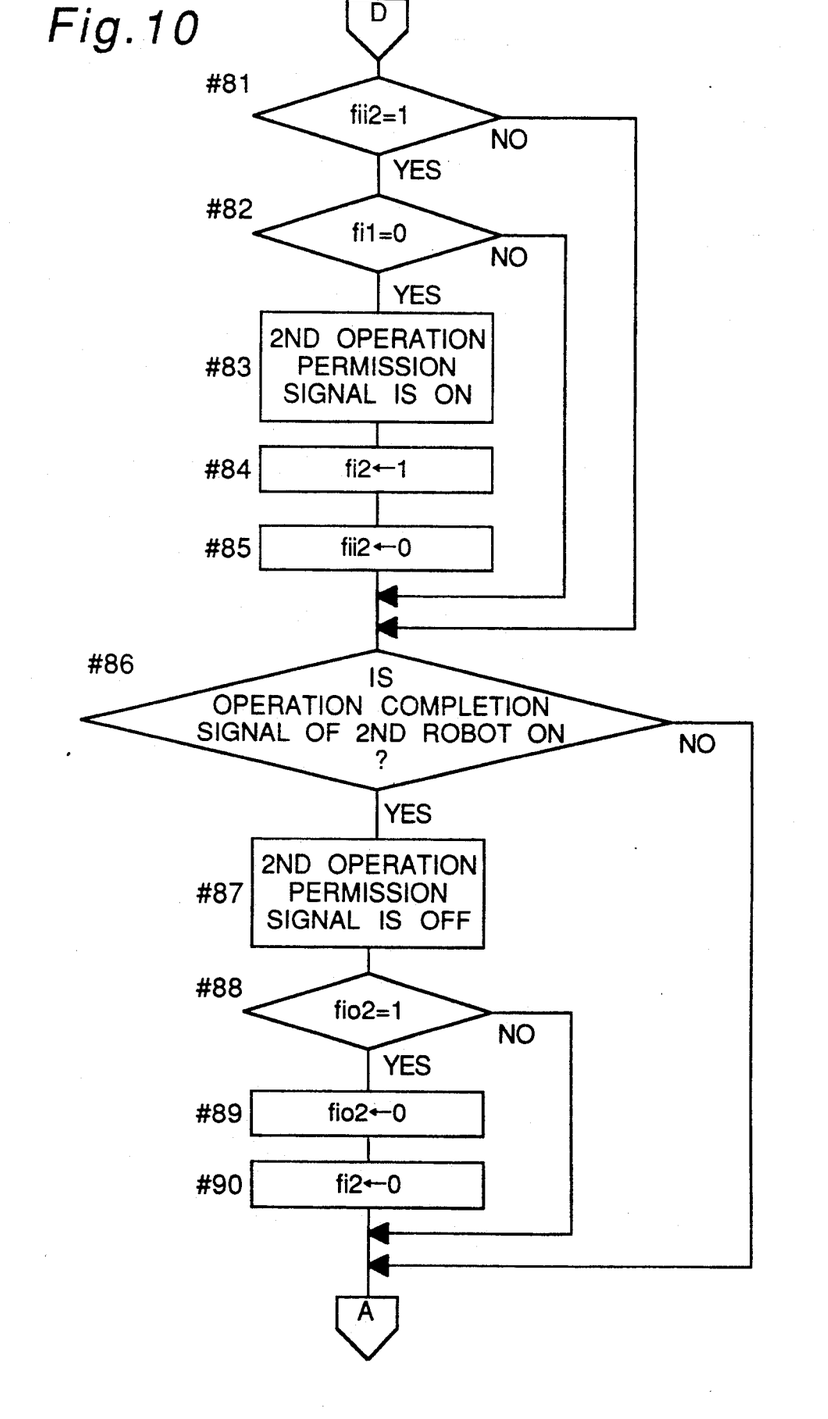

Now, a process in FIG. 10 of the checking system will be described. With reference to a flow chart of FIG. 10, when fii=2 in step #81, the flow advances to step #82 to detect whether fi1=0. When fi1=0, the second operation permission signal is turned ON in step #83, the flag fi2 is turned to 1 in step #84, the flag fii2 is set to 0 in step #85 and, the process is subsequently proceeded to step #86. Meanwhile, if fii2=1 is not satisfied in step #81 or when fi1=0 is not held in step #82, the step moves to step #86. It is checked in step #86 whether the operation completion signal of the second robot 32 is ON or not. When the operation completion signal of the second robot 32 is ON, the second operation permission signal is turned OFF in step #87, and it is checked whether or not fio2=1 in step #88. When fio2=1, the flag fio2 is changed to 0 in step #89, and the flag fi2 is set to 0 in step #90. Thereafter, the flow is sent back to step #23 in FIG. 7. If the operation completion signal of the second robot 32 is not ON in step #86, the step moves to step #23 of FIG. 7. Also when the flag fio2 is not equal to 1 in step #88, the processing flow is returned to step #23 in FIG. 7.

As described hereinabove, according to the first embodiment of the present invention, it is possible to form a program for a robot controller of each robot without minding the collision of the robots, thereby to realize an automatic controlling system to avoid the interference of the robots.

A second embodiment of the present invention will now be discussed below. The appearance and construction of a system according to the second embodiment are the same as of the first embodiment above, but the correcting content of the program of each robot controller is different.

Figure 11:
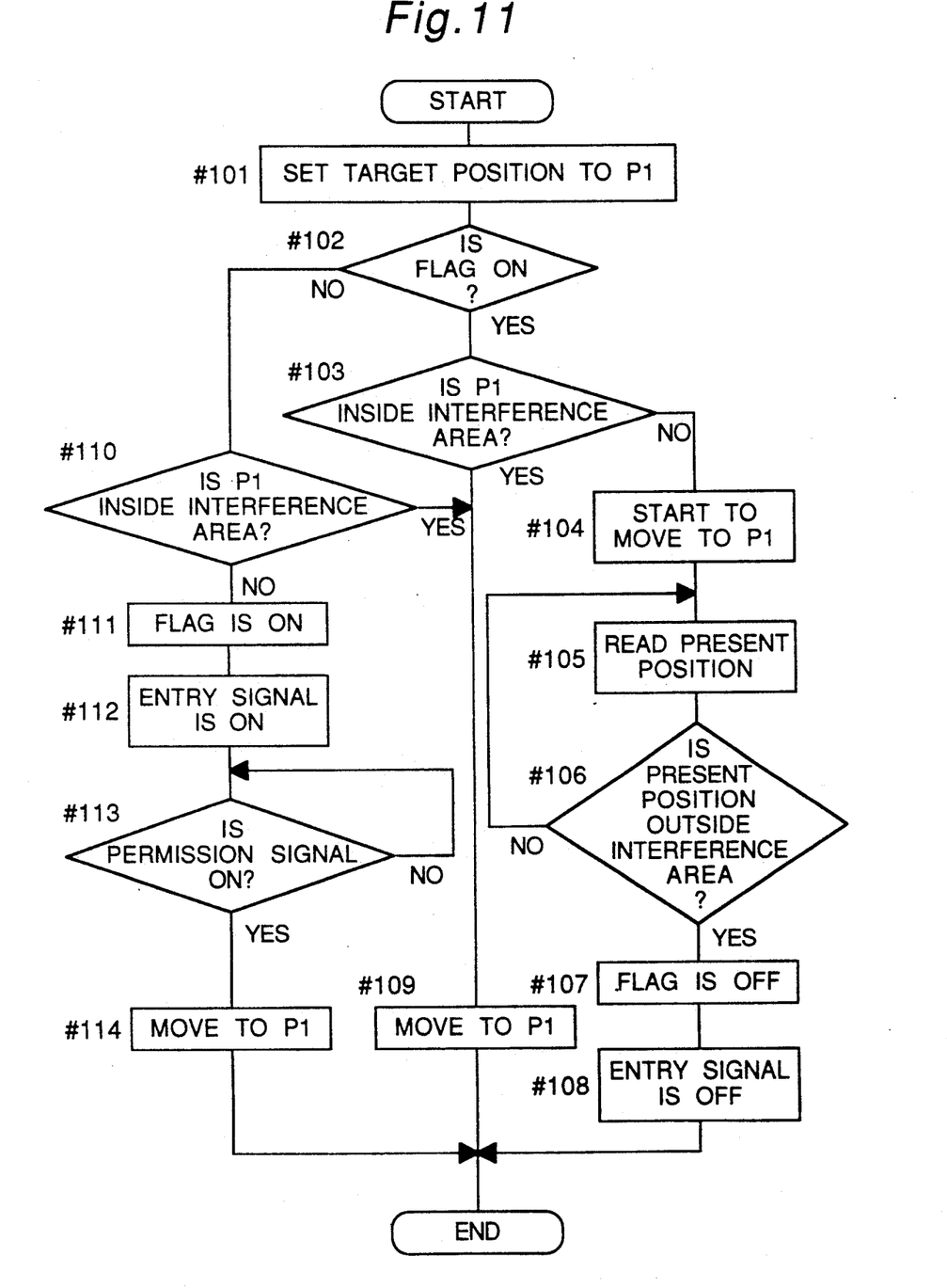
FIG. 11 is a flow chart of a sub routine wherein an operation command of a robot is replaced in a second embodiment.

The correcting process of the second embodiment proceeds in the same manner as in the flow chart of FIG. 5. As an initialization process, a sub routine to receive data to designate the interference area through communications from the checking device 1 is inserted, and an operation command of each robot is replaced with a sub routine to execute a processing flow of FIG. 11. The correcting means 18 of the checking device 1 inserts a third processing code to receive the interference area of the first and second robots 31 and 32 through the communication with the checking device 1, a fourth processing code to transmit an entry signal to the checking device 1 when it discriminates immediately before the robot starts operating that the robot moves from outside the interference area to inside the interference area and then to wait for the operation permission signal from the checking device 1, and a fifth processing code to start the operation of the robot and then to transmit an outside signal after the robot is outside the interference area when it discriminates that the robot moves from inside the interference area to outside the interference area, so that the discriminating means 17 of the checking device 1 discriminates on the basis of the entry signal and the outside signal of each robot controller. Accordingly, during operation, each robot controller receives data of the interference area from the checking device 1. When the operation command of the robot is to be executed, the process in FIG. 11 is executed by the robot controller. It is decided immediately before the robot starts working whether the robot moves from outside the interference area to inside the interference area or vice versa. If the robot moves from outside to inside the interference area, an entry signal is sent to the checking device 1 to wait for an operation permission signal from the checking device 1. On the other hand, when the robot moves from inside the interference area to outside the interference area, the robot is permitted to start working, and after the robot comes out of the interference area, an outside signal is sent from its robot controller to the checking device 1. The checking device 1 discerns whether or not the robots 31 and 32 interfere with each other according to a processing flow of FIG. 12, with generating an operation permission signal when it detects that the robots 31 and 32 do not interfere.

The sub routine when the operation command of the robot is replaced will be described in detail. Referring to FIG. 11, the target position is set to P1 in step #101 and it is checked in step #102 whether the flag is ON, that is, the robot is being inside the interference area. When the flag is ON, that is, the robot is being there inside, it is detected in step #103 whether or not P1 is inside the interference area. If P1 is outside the interference area (the robot is moving from inside the interference area to outside the interference area), the robot starts moving to P1 in step #104. The present position of the arm of the robot is read in step #105, and detected whether it is outside the interference area in step #106. When the present position of the arm is outside the interference area, the flag is turned OFF in step #107, and the entry signal is turned OFF in step #108, thus completing the flow. In the case where the current position of the arm is not outside the interference area in step #106, the flow is returned to step #105. When it is found in step #103 that P1 is inside the interference area (the robot is moving from inside the interference area to inside the interference area), the robot is moved to P1 in step #109 and the process is terminated. If the flag is not ON in step #102, it is checked in step #110 whether or not P1 is inside the interference area. In the case of P1 being outside the interference area (the robot is moving from outside to outside the interference area), the flow proceeds to step #109. When it is detected in step #110 that P1 is inside the interference area, the flag is set ON in step #111, the entry signal is turned ON in step #112, and it is waited in step #113 until the operation permission signal from the checking device 1 is ON. Thereafter, the robot is moved to P1 in step #114, when the flow is completed.

Figure 12:
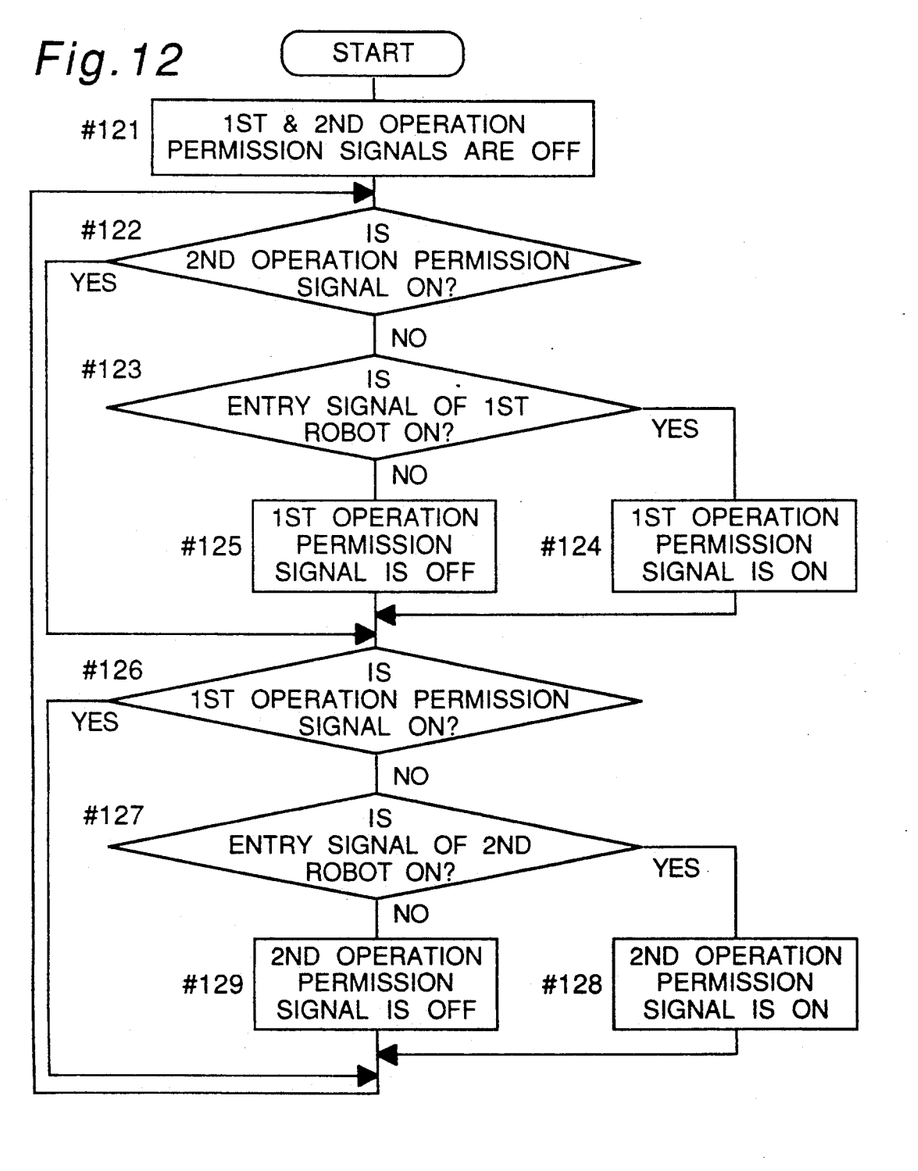
FIG. 12 is a flow chart when the checking system is operating in the second embodiment.

Now, the operating process of the checking system will be described with reference to the flow chart of FIG. 12. In FIG. 12, the first operation permission signal is set OFF in step #121, and also the second operation permission signal is turned OFF. It is detected in step #122 whether the second operation permission signal becomes ON. If the second operation permission signal is not turned ON, the entry signal of the first robot 31 is detected in step #123. That is, when the entry signal of the first robot 31 is ON, the first operation permission signal is turned ON in step #124, with the flow moving to step #126. When the entry signal of the first robot 31 is not turned ON in step #123, the first operation permission signal is set OFF in step #125, and then the flow proceeds to step #126. When the second operation permission signal is turned ON in step #122, the flow moves to step #126. It is detected in step #126 whether the first operation permission signal is ON or not. If the first operation permission signal is not ON, it is checked in step #127 whether the entry signal of the second robot 32 is ON. After the second operation permission signal is changed to ON in step #128 since the entry signal of the second robot 32 is ON, the flow returns to step #122. In the case where the entry signal of the second robot 32 is not ON in step #127, the second operation permission signal is set OFF in step #129 and then, the flow is brought back to step #122. When the first operation permission signal is ON in step #126, the flow goes to step #122.

According to the second embodiment alike, it is possible to form a program for the robot controller of each robot without minding the collision of the robots, thereby realizing an automatic controlling system to avoid the interference of robots 31 and 32. In comparison with the first embodiment, the second embodiment reduces the number of communications between the robot controller 2, 3 and the checking device 1, and the robot controller 2, 3 processes a larger deal of data.

As described hereinabove, the robot system of the embodiments is provided with the correcting means which inserts a processing code into the code string of the robot controller to automatically avoid the interference of robots 31 and 32 in a relatively shortened processing time. Therefore, it becomes possible to form a program for each robot without taking care of the collision of the robots 31 and 32. Labor when the program is formed or the system is changed can be reduced markedly. According to the embodiment, in order to check the interference by means of the automatically inserted code string, the control means of the robot controller transmits the next target operating position to the checking device immediately before the robot starts operating, and the checking device controls the operating position immediately before then, the present target position, and the interference area of each robot thereby to detect the interference of the robots. Therefore, the robot controller can control without concerning the interference area of the robots. And the correcting means automatically inserts a processing code to transmit the data designating the interference area of the robots to the robot controller, and transfers the data when the operation is started. Therefore, it is possible to detect whether the robot moves to outside or inside the interference area in the correcting code of the robot controller to check the interference. Since the communicating time with the checking device for all the operations of the robot controllers becomes unnecessary, the processing time can be shortened particularly when the communications time is relatively long. Moreover, the correcting means selectively inserts the processing code, and therefore it is not necessary to check the interference when the operating direction is not related to the interference of the robots. The checking time is reduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An interference avoiding system of multi arms in a robot system equipped with a plurality of robots comprising: robot controllers for controlling respective robots; and a checking device which communicates with the each robot controller,
   wherein each robot controller is provided with
   a storing means;
   a control means for controlling an operation of the robot in accordance with a code string stored in the storing means;
   means for communicating with the checking device;
   means for transferring the code string stored in the storing means to the checking device through communication; and
   means for storing the code string transferred from the checking device in the storing means through the communication,
   while the checking device is provided with:
   means for setting an interference area of the operation of the plurality of robots;
   means for reading the code string in the storing means of each robot controller through the communication;
   means for automatically correcting the read code string;
   means for transferring the corrected code string to the robot controller through the communication; and
   means for discriminating whether or not the robots interfere with each other based on the communication with the robot controller thereby to transmit an operation permission signal when it discriminates that the robots do not interfere,
   the correcting means finding the operation of the robots in the read code string, and communicating with the discriminating means immediately before the robot starts operating, thereby to insert a processing code into the code string to suspend a next start of operation until an operation permission signal is received from the checking device.

2. The interference avoiding system according to claim 1, wherein the correcting means transmits a target operating position of the robot from the control means of each robot controller to the checking device immediately before the robot starts operating, with inserting a first processing code to wait for the operation permission signal from the checking device and a second processing code to inform an operation completion immediately after the robot completes its operation into the code string, and the discriminating means of the checking device discriminates whether or not the robots interfere with each other based on the target operating position of the robot and a communication content with each robot controller until then, thereby to transmit the operation permission signal when the robots do not interfere.

3. The interference avoiding system according to claim 1, wherein the correcting means inserts a third processing code to receive the interference area of the robots through the communication with the checking device, a fourth processing code to transmit an entry signal to the checking device when it discriminates immediately before the robot starts operating that the robot moves from outside the interference area to inside the interference area and then to wait for the operation permission signal from the checking device, and a fifth processing code to start the operation of the robot and then to transmit an outside signal after the robot is outside the interference area when it discriminates that the robot moves from inside the interference area to outside the interference area, so that the discriminating means of the checking device discriminates on the basis of the entry signal and the outside signal of each robot controller.

4. The interference avoiding system according to claim 1, wherein the correcting means inserts a processing code to selectively communicate with the checking device depending on an operating direction of the robot.

5. The interference avoiding system according to claim 2, wherein the correcting means inserts a processing code to selectively communicate with the checking device depending on an operating direction of the robot.

6. The interference avoiding system according to claim 3, wherein the correcting means inserts a processing code to selectively communicate with the checking device depending on an operating direction of the robot.

* * * * *